United States Patent [19]

Matsuo

[11] 4,253,627
[45] Mar. 3, 1981

[54] MULTI-LAYER RAM AIR PARACHUTE CANOPY

[75] Inventor: Jon T. Matsuo, China Lake, Calif.

[73] Assignee: The United States of America as represented by the Secretary of the Navy, Washington, D.C.

[21] Appl. No.: 70,239

[22] Filed: Aug. 27, 1979

[51] Int. Cl.$^3$ .................... B64D 17/04; B64D 17/18
[52] U.S. Cl. .................................... 244/145; 244/152
[58] Field of Search ................ 244/142, 146, 145, 152

[56] References Cited

U.S. PATENT DOCUMENTS

| | | | |
|---|---|---|---|
| 1,737,913 | 12/1929 | Broadwick | 244/145 |
| 2,562,799 | 7/1951 | Kowalski | 244/145 |
| 2,759,694 | 8/1956 | Lemoigne | 244/145 |
| 2,764,375 | 9/1956 | Lemoigne | 244/145 |
| 3,428,277 | 2/1969 | Everette, Jr. | 244/146 |

FOREIGN PATENT DOCUMENTS

| | | | |
|---|---|---|---|
| 2423795 | 1/1975 | Fed. Rep. of Germany | 244/145 |
| 475052 | 1/1915 | France | 244/145 |
| 50364 | 4/1940 | France | 244/152 |
| 1094528 | 3/1955 | France | 244/142 |
| 780754 | 8/1957 | United Kingdom | 244/142 |

*Primary Examiner*—Galen L. Barefoot
*Attorney, Agent, or Firm*—R. S. Sciascia; George J. Rubens; W. Thom Skeer

[57] ABSTRACT

Maximum lifting force is achieved in a dome-shaped parachute by fabricating the canopy of upper and lower spaced canopy membranes. A plurality of circumferentially spaced, radially disposed, flexible rib sections are connected between the canopy membranes to form a plurality of ram air cells, each cell having a ram air inlet port at the canopy hem, and a ram air outlet port at a central vent at the canopy apex. The rib sections can be provided with porous sections to equalize the ram air pressure between adjacent cells. The bottom canopy wall in each ram air cell may also be provided with a porous section for admitting the positive air beneath the canopy into each cell. A pull down vent line can be connected to the canopy apex for changing the camber or angle of attack, and therefor the parachute drag.

4 Claims, 5 Drawing Figures

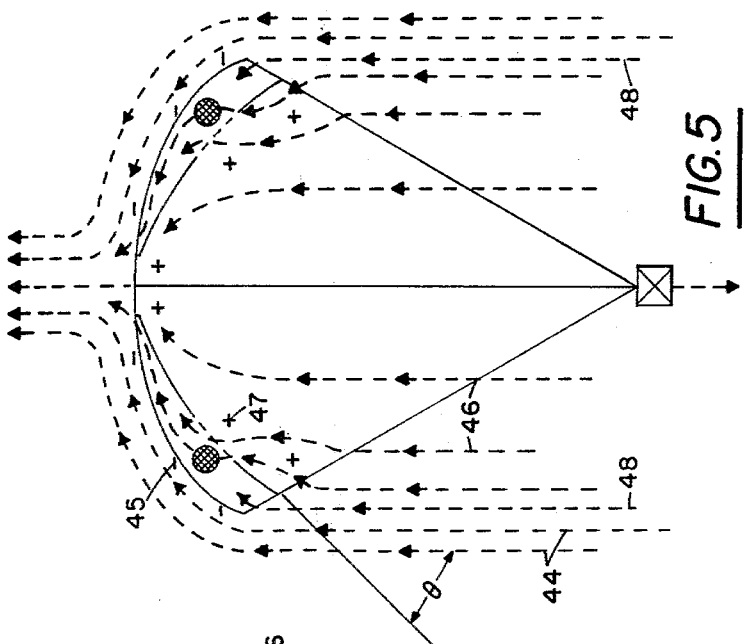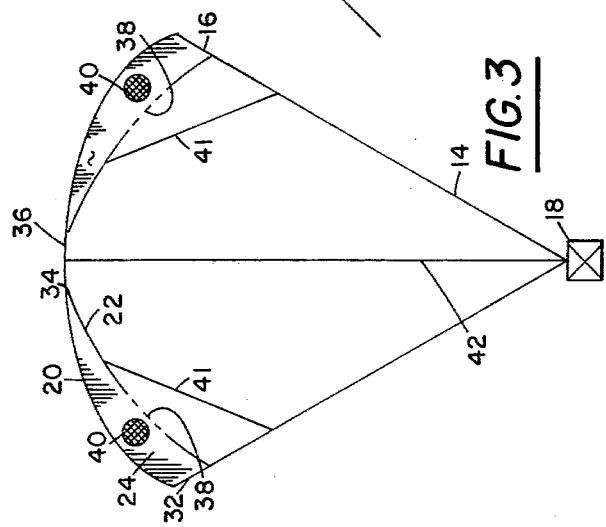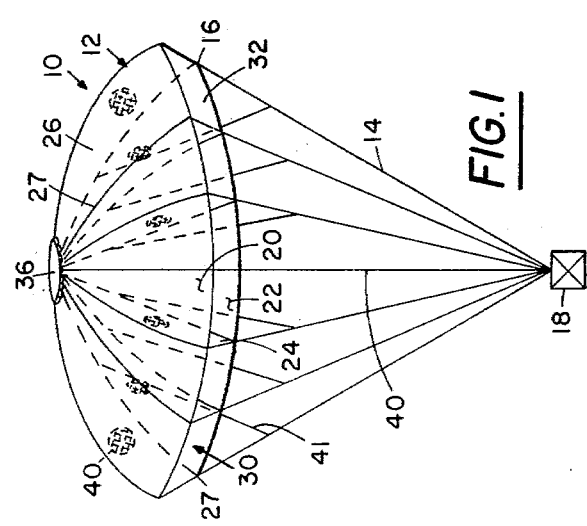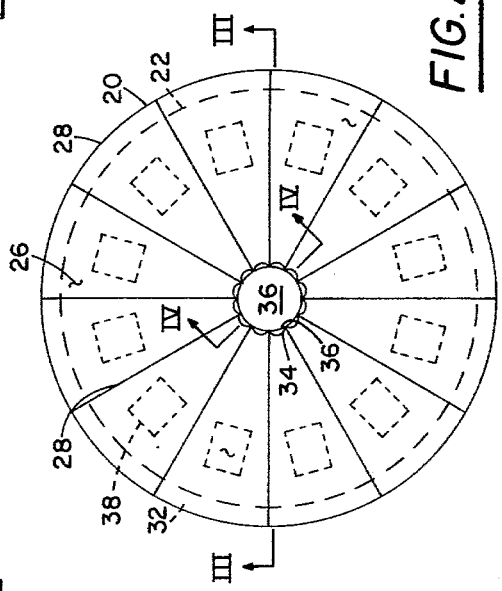

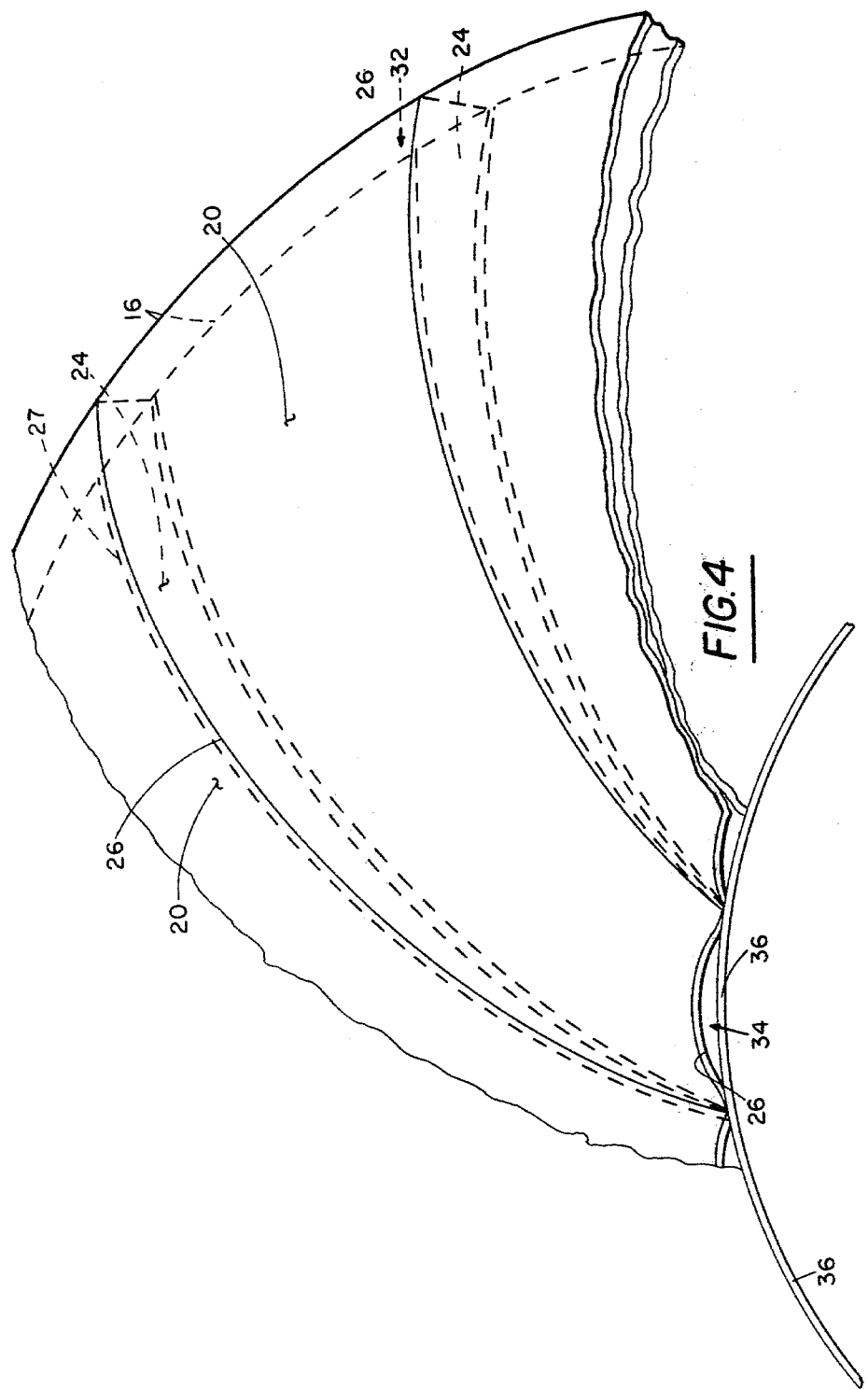

MULTI-LAYER RAM AIR PARACHUTE CANOPY

BACKGROUND OF THE INVENTION

This invention relates to dome-shaped, parachute canopy construction, and particularly to such a canopy having an increased drag force created by the use of ram air cells.

Current and past generations of flexible, circular aerodynamic parachutes traditionally have been of a single membrane construction, which does not take full advantage of the aerodynamic thickness ratio theory. As a consequence, parachutes are not as aerodynamically efficient as aircraft wings having a designed thickness.

Accordingly the present invention has been conceived to construct a parachute with a multi-walled thickness to approximate the thickness of an aircraft wing to make the parachute more efficient; an increase of approximately thirty percent drag is estimated with this novel construction.

SUMMARY OF THE INVENTION

A more efficient circular parachute is provided by constructing the canopy of upper and lower spaced, flexible membranes to provide the canopy with a thickness. Ram air inflated cells are provided around the canopy periphery between the membranes having inlet and outlet ports extending from the canopy hem to the canopy apex. A pull down vent line can be connected to the canopy apex for varying the camber, and consequently the drag forces. Cascade lines can be connected between intermediate points on the suspension lines to intermediate points on the lower canopy membranes to assist in maintaining the desired canopy thickness.

OBJECTS OF THE INVENTION

It is a principle object of this invention to construct a circular, dome-shaped parachute canopy having improved retardation or lifting force.

Another important object is to provide such a parachute in which the canopy approximates the profile of an aircraft wing.

Further objects are to provide a parachute that is more efficient in operation, and in which the lifting force can be varied.

Other objects, advantages and novel features of the invention will become apparent from the following detailed description of the invention when considered in conjunction with the accompanying drawings.

BRIEF DESCRIPTION OF THE DRAWINGS

FIG. 1 is a side perspective view of a fully inflated parachute constructed according to the teaching of this invention;

FIG. 2 is a top view of the parachute of FIG. 1;

FIG. 3 is a cross-sectional view of the parachute of FIG. 2 taken along line III—III;

FIG. 4 is a trailing perspective end view of the exhaust port of one of the ram air cells taken along line IV—IV of FIG. 2;

FIG. 5 is a similar view as FIG. 3 illustrating the airflow pattern around and through the canopy, and the pressure distribution thereon.

DESCRIPTION OF THE PREFERRED EMBODIMENT

Referring to the drawings where like reference numerals refer to similar parts throughout the figures there is shown in FIG. 1 a fully inflated parachute 10 having a flexible, circular dome-shaped canopy 12 with conventional suspension lines 14 connected to the canopy hem 16 and to a load 18. The novelty of this invention resides in an improved canopy construction which is aerodynamically configured into an aircraft wing, which construction will gain approximately a thirty percent increase in aerodynamic efficiency by taking advantage of the aerodynamic thickness ratio thickness. Practically all aircraft wings have thicknesses designed into them, and are generally referred to as wing thickness ratio $$\frac{\text{(maximum wing thickness)}}{\text{wing cord length}}.$$

Canopy 12 is constructed with an upper and lower canopy layer or membrane 20 and 22, respectively, spaced apart by a plurality of vertically extending spaced ribs 24 secured at their upper and lower edges to the respective canopy membranes circumferentially thereof. The canopy fabric is usually constructed of a relatively non-porous fabric. Where the canopy is composed of a plurality of gore sections 26, being the conventional practice, the ribs can be sewn at seams 27 at the same time the gore sections are sewn together. Ribs 24 form a plurality of ram air cells 30 between the canopy membranes, each having an air inlet port 32 at canopy hem 16, and an air outlet port 34 at vent opening 36 at the canopy apex. For a conventional 28 foot canopy diameter, it is estimated that ram air inlet 32 can be in the order of 1'×2', and ram air outlet can be in the order of 1"×2", although such dimensions are not considered critical, and will vary with the diameter of the canopy.

Positive air pressure is ported from underneath the canopy into the air cells through porous sections 38, fabricated of Marquisette mesh material, or like, formed in the lower canopy membrane of each cell, as best illustrated in FIG. 2, which assist in maintaining the air cells inflated to the optimum configuration.

The walls of ribs 24 can also be provided with porous sections 40, made of a similar Marquisette mesh material or the like, which sections port air under pressure from beneath the lower canopy and from inlet ports 32 laterally between the air cells to equalize the positive pressure under the canopy and to balance parachute descent.

A plurality of cascade lines 41 are connected between intermediate points on the respective suspension lines, and to intermediate points on lower canopy membrane 22, preferably at the gore seams, for a purpose to be described.

A conventional pull down vent line 42 is connected around apex vent 36 and down to the load. The angle of attack of the canopy, as represented by the angle θ, and the camber can be readily increased or decreased by shortening or lengthening cascade lines 41 and pull down vent line 42, respectively. By this construction every vertical cross section of the novel ram air inflated canopy of this invention can be made almost a perfect aerodynamic wing profile.

The airflow pattern and pressure distribution exerted on a deployed parachute constructed in accordance with the teaching of this invention is illustrated in FIG. 5. Streamlines 44 represent the direction of the relative wind that passes over upper canopy membrane 20 creating a negative pressure on the upper side thereof, as represented by the symbols 45. Streamlines 46 assist in maintaining the positive air pressure on the bottom side of lower canopy membrane 22, as represented by the symbols 47, as well as maintaining positive air pressure in air cells 30 through porous sections 38. Airstream 48 enters ram air inlet port 32, and with the assistance of porous equalizer sections 40 maintains the necessary ram air pressure to keep the desired inflated cell configuration.

Ram air exhaust port 34 functions on the venturi principle, that is, the faster the exhausted air through the port, the greater the port closing force. Thus, the exhaust ports assist in maintaining the configuration of the trailing edge of the canopy for greater aerodynamic airfoil efficiency; assist in maintaining exhaust laminar flow near the trailing edge, while providing an exhaust flow which is self-regulation by virtue of the venturi principle.

Obviously many modifications and variations of the present invention are possible in the light of the above teachings. It is therefore to be understood that within the scope of the appended claims the invention may be practiced otherwise than as specifically described.

What is claimed is:

1. A parachute for variably decelerating a connected load comprising:
   a flexible, dome-shaped canopy having upper and lower circular, concentric canopy membranes,
   each said membrane having a hem around the outer edge thereof and an apex with an air vent at the center thereof, said air vents being of equal size;
   a plurality of suspension lines connected between said canopy hems and said load;
   a plurality of radially extending and circumferentially spaced ribs connecting said upper and lower membranes in spaced relation thereto and forming a plurality of airfoil-shaped ram air cells therebetween;
   each said cell having a ram air inlet port at said hem and a ram air exhaust port at said apex air vents and diminishing in cross-sectional area from said hem to said apex;
   means for simultaneously varying the airflow through and the camber of said airfoil-shaped ram air cells attached to said apex;
   each of said ribs having a porous section made of a mesh-like material therein for the passage of air therebetween to equalize the air pressure between adjacent cells;
   said lower canopy membrane having a porous section at each said airfoil-shaped ram air cell to allow the passage of air pressure under the canopy to enter said airfoil-shaped ram air cell;
   whereby a maximum retardation force on said parachute is achieved during descent.

2. The parachute of claim 1 wherein said means is a pull down vent line connected to said canopy apex.

3. The parachute of claim 2 wherein a plurality of spaced cascade lines are connected between intermediate points on said suspension lines and said lower membrane.

4. The parachute of claim 3 wherein the mouth of each of said ram air inlets lies substantially in a plane coextensive with a plane containing the respective adjacent suspension lines.

* * * * *